(12) United States Patent
Ghemawat et al.

(10) Patent No.: US 9,298,576 B2
(45) Date of Patent: Mar. 29, 2016

(54) COLLECTING PROCESSOR USAGE STATISTICS

(71) Applicant: Google Inc., Mountain View, CA (US)

(72) Inventors: Sanjay Ghemawat, Mountain View, CA (US); Andrew Fikes, Los Altos, CA (US); Chris Jorgen Taylor, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 360 days.

(21) Appl. No.: 13/910,052

(22) Filed: Jun. 4, 2013

(65) Prior Publication Data

US 2014/0025810 A1 Jan. 23, 2014

Related U.S. Application Data

(60) Provisional application No. 61/655,445, filed on Jun. 4, 2012.

(51) Int. Cl.
*G06F 11/30* (2006.01)
*G06F 11/34* (2006.01)

(52) U.S. Cl.
CPC ........ *G06F 11/3024* (2013.01); *G06F 11/3419* (2013.01); *G06F 11/3433* (2013.01); *G06F 11/3466* (2013.01); *G06F 11/3495* (2013.01); *G06F 2201/865* (2013.01); *G06F 2201/88* (2013.01)

(58) Field of Classification Search
USPC ......................................................... 709/224
See application file for complete search history.

(56) References Cited

U.S. PATENT DOCUMENTS

| 5,421,007 A | 5/1995 | Coleman et al. |
| 5,832,521 A | 11/1998 | Klots et al. |
| 6,477,544 B1 | 11/2002 | Bolosky et al. |

(Continued)

FOREIGN PATENT DOCUMENTS

| WO | WO 2011/100366 A2 | 8/2011 |
| WO | WO 2012/040391 A1 | 3/2012 |

OTHER PUBLICATIONS

International Search Report and Written Opinion dated Nov. 14, 2013, received in International Application No. PCT/US2013/044105, which corresponds to U.S. Appl. No. 13/909,021, 7 pages (Yasushi Saito).

(Continued)

*Primary Examiner* — Tu Nguyen
(74) *Attorney, Agent, or Firm* — Morgan, Lewis & Bockius LLP (57) ABSTRACT

In accordance with some implementations, a method of collecting statistics about processor usage is disclosed. The method is performed on a data storage server having one or more processors and memory storing one or more programs for execution by the one or more processors. The server system executes one or more processes, wherein each of the one or more first processes is associated with an entity from a group of one or more entities. The server system then receives an interrupt signal at a first predetermined interval. In response to receiving the interrupt signal and for each processor of the one or more processors, the server system interrupts the process currently being executed on the processor. The server system increments the counter associated with the interrupted process. The server system then resumes the interrupted process.

19 Claims, 7 Drawing Sheets

(56) References Cited

U.S. PATENT DOCUMENTS

| | | |
|---|---|---|
| 6,963,914 B1 | 11/2005 | Breitbart et al. |
| 6,981,114 B1 | 12/2005 | Wu et al. |
| 7,334,004 B2 | 2/2008 | Ganesh et al. |
| 7,430,570 B1 | 9/2008 | Srinivasan et al. |
| 7,774,469 B2 | 8/2010 | Massa et al. |
| 8,627,135 B2 | 1/2014 | Aron et al. |
| 8,719,432 B1 | 5/2014 | Vermeulen et al. |
| 8,838,539 B1 | 9/2014 | Ashcraft et al. |
| 8,850,130 B1 | 9/2014 | Aron et al. |
| 8,949,208 B1 | 2/2015 | Xu et al. |
| 2002/0133507 A1 | 9/2002 | Holenstein et al. |
| 2003/0065708 A1 | 4/2003 | Jacobs et al. |
| 2005/0015404 A1 | 1/2005 | Cherkasova |
| 2005/0066118 A1 | 3/2005 | Perry |
| 2005/0149627 A1 | 7/2005 | Schreter |
| 2005/0177590 A1 | 8/2005 | Chen et al. |
| 2005/0192991 A1 | 9/2005 | Nomoto et al. |
| 2006/0047895 A1 | 3/2006 | Rowan |
| 2007/0016546 A1 | 1/2007 | De Vorchik et al. |
| 2007/0050429 A1 | 3/2007 | Goldring et al. |
| 2007/0183224 A1 | 8/2007 | Erofeev |
| 2008/0071853 A1 | 3/2008 | Mosier et al. |
| 2008/0096662 A1* | 4/2008 | Kuwahara et al. ............... 463/41 |
| 2008/0243879 A1 | 10/2008 | Gokhale et al. |
| 2008/0250072 A1 | 10/2008 | Nguyen |
| 2008/0263305 A1 | 10/2008 | Shu et al. |
| 2009/0070330 A1 | 3/2009 | Hwang et al. |
| 2009/0327642 A1 | 12/2009 | Ogihara et al. |
| 2010/0023520 A1 | 1/2010 | Barboy et al. |
| 2010/0077165 A1 | 3/2010 | Lu et al. |
| 2010/0281013 A1 | 11/2010 | Graefe |
| 2011/0196664 A1 | 8/2011 | Zunger et al. |
| 2012/0036161 A1 | 2/2012 | Lacapra et al. |
| 2012/0151272 A1 | 6/2012 | Behrendt et al. |
| 2012/0159102 A1 | 6/2012 | Kan |
| 2012/0303791 A1 | 11/2012 | Calder et al. |
| 2013/0060742 A1 | 3/2013 | Chang et al. |
| 2013/0110774 A1 | 5/2013 | Shah et al. |
| 2013/0204991 A1 | 8/2013 | Skjolsvold et al. |
| 2013/0318129 A1 | 11/2013 | Vingralek e al. |
| 2013/0346365 A1 | 12/2013 | Kan et al. |
| 2015/0012497 A1 | 1/2015 | Clark et al. |

OTHER PUBLICATIONS

International Search Report and Written Opinion dated Dec. 13, 2013, received in International Application No. PCT/US2013/042063, which corresponds to U.S. Appl. No. 13/898,411, 17 pages (Jeffrey Adgate Dean).

Bernstein, Chapter 5-Multiversion Concurrency Control, Concurrency Control and Recovery in Database Systems, Jan. 1, 1987, 24 pgs.

Elmasri, Chapter 20-Physical Database Design and Tuning, Fundamentals of Database Systems, 6th Ed., Addison-Wesley, Jan. 1, 2011, 16 pgs.

Garcia-Molina, Chapter 18-Concurrency Control, Database Systems: The Complete Book, Prentice-Hall, Jan. 1, 2002, 72 pgs.

Garcia-Molina, Chapter 1-The Worlds of Database Systems, Database Systems: The Complete Book, Prentice Hall, Jan. 1, 2002, 21 pgs.

Google Inc., International Search Report and Written Opinion, PCT/US2013/044163, May 9, 2014, 11 pgs.

Zhang, Supporting Multi-Row Distributed Transactions with Global Snapshot Isolation Using Bare-Bones Hbase, 11th IEEE/ACM Int'l Conf. on Grid Computing, Piscataway, NJ, Oct. 25, 2010, pp. 177-184.

Ghemawat, The Google File System, Proc. of the ACM Symposium on Operating Systems Principles, Oct. 19, 2003, pp. 1-15.

Ivanova, Self-Organizing Strategies for a Column-Store Database, Proc. of the 11th International Conference on Extending Database Technology Advances in Database Technology, EDBT'08, Mar. 25, 2008, pp. 157-168.

Google Inc., Invitation to Pay Additional Fees, PCT/US2013/042063, Jul. 30, 2013, 8 pgs.

Google Inc., International Preliminary Report on Patentability, PCT/US2013/044105, Dec. 9, 2014, 4 pgs.

Google Inc., International Preliminary Report on Patentability, PCT/US2013/044163, Dec. 9, 2014, 9 pgs.

Chang, Bigtable: A Distributed Storage System for Structured Data, Google, Nov. 2006, 14 pgs, research.google.com/archive/bigtable.html.

* cited by examiner

COLLECTING PROCESSOR USAGE STATISTICS

RELATED APPLICATIONS

This application claims priority to U.S. Provisional Application No. 61/655,445, filed Jun. 4, 2012, entitled "Collecting Processor Usage Statistics," which is incorporated by reference herein in its entirety.

TECHNICAL FIELD

The disclosed implementations relate generally to gathering statistical information regarding processor usage in a server system.

BACKGROUND

A computer system typically includes one or more processors. The computer system employs these one or more processors to execute the processes required to perform the functions desired by the computer's user. Additionally, many computer systems often have to run a large number of different processes. With many processes simultaneously requesting to be executed, the computer system must determine which processes to run based on processor availability and priority of the various processes. The operating system schedules the processes and allocates processor time, often interrupting low priority processes to run processes with a higher priority. In this way the operating system balances the competing needs of various processors to efficiently complete tasks. Some computer systems include only a single processing core, while other computer systems include a plurality of processor cores. Computer systems that include more than one processor core must simultaneous manage scheduling and prioritizing processes across multiple cores.

The operating system has several mechanisms available to it to ensure the most important tasks are executed in a timely manner. In some systems the operating system will regularly determine, based on priority information or other information, the process that should be executed for the next time interval. This allows high priority processes to be executed before lower priority processes complete, even if the lower priority process began before the higher priority process. Additionally, the operating system may generate asynchronous interrupts in response to various criteria being met. Interrupts may be hardware interrupts, in which the interrupt signal is detected by a physical piece of hardware, like an advance programmable interrupt controller, or software interrupts. The kernel, an important component of the operating system, then interrupts the currently executing processes and allows an interrupt handler to execute. In this way, the computer system can respond quickly to various criteria being met.

SUMMARY

In accordance with some implementations, a method of measuring processor usage is disclosed. The method is performed on a server system having one or more processors and memory storing one or more programs for execution by the one or more processors. The server system executes, on the one or more processors, one or more processes, wherein each of the one or more first processes is associated with an entity from a group of one or more entities. The server system then receives an interrupt signal at a first predetermined interval. In response to receiving the interrupt signal and for each processor of the one or more processors, the server system interrupts the process currently being executed on the processor. The server system then determines if the interrupted process has an associated counter. In accordance with a determination that the interrupted process has an associated counter, the server system increments the associated counter. The server system then resumes the interrupted process.

In accordance with some implementations, a method of tracking processor usage of a thread disclosed. The method is performed on a server system having one or more processors and memory storing one or more programs for execution by the one or more processors. The server system creates a thread associated with an entity. The server system then records a pointer to a counter associated with the entity in the thread. The server system then receives, at regular, predetermined intervals, a signal from the operating system being executed on the server system. In response, the server system determines whether the thread is currently being executed by one of the one or more processors. In accordance with a determination that the thread is currently being executed by one processor of the one or more processors the system interrupts the thread being executed and increments a counter associated with the thread.

In accordance with some implementations, a server system for measuring processor usage is disclosed. The server system has one or more processors and memory storing one or more programs to be executed by the one or more processors. The one or more programs include instructions which cause the system to execute, on the one or more processors, one or more processes, wherein each of the one or more first processes is associated with an entity from a group of one or more entities. The server system then receives an interrupt signal at a first predetermined interval. In response to receiving the interrupt signal and for each processor of the one or more processors, the server system interrupts the process currently being executed on the processor. The server system then determines if the interrupted process has an associated counter. In accordance with a determination that the interrupted process has an associated counter, the server system increments the associated counter. The server system then resumes the interrupted process.

In accordance with some implementations, a server system for tracking processor usage of a thread disclosed. The server system has one or more processors and memory storing one or more programs to be executed by the one or more processors. The one or more programs include instructions which cause the system to create a thread associated with an entity. The server system then records a pointer to a counter associated with the entity in the thread. The server system then receives, at regular, predetermined intervals, a signal from the operating system being executed on the server system. In response, the server system determines whether the thread is currently being executed by one of the one or more processors. In accordance with a determination that the thread is currently being executed by one processor of the one or more processors the system interrupts the thread being executed and increments a counter associated with the thread.

In accordance with some implementations, a non-transitory computer readable storage medium storing one or more programs configured for execution by a server system is disclosed. The server system has one or more processors and memory storing one or more programs to be executed by the one or more processors. The one or more programs include instructions which cause the system to execute, on the one or more processors, one or more processes, wherein each of the one or more first processes is associated with an entity from a group of one or more entities. The server system then receives an interrupt signal at a first predetermined interval. In response to receiving the interrupt signal and for each processor of the one or more processors, the server system interrupts the process currently being executed on the processor. The server system then determines if the interrupted process has an associated counter. In accordance with a determination that the interrupted process has an associated counter, the server system increments the associated counter. The server system then resumes the interrupted process.

In accordance with some implementations, a non-transitory computer readable storage medium storing one or more programs configured for execution by a server system is disclosed. The server system has one or more processors and memory storing one or more programs to be executed by the one or more processors. The one or more programs include instructions which cause the system to create a thread associated with an entity. The server system then records a pointer to a counter associated with the entity in the thread. The server system then receives, at regular, predetermined intervals, a signal from the operating system being executed on the server system. In response, the server system determines whether the thread is currently being executed by one of the one or more processors. In accordance with a determination that the thread is currently being executed by one processor of the one or more processors the system interrupts the thread being executed and increments a counter associated with the thread.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

In some implementations, a server system is a component in a distributed server system. Large server systems include a plurality of processing cores across a large number of systems and/or sites. In some implementations the server system stores and retrieves data for multiple entities. An entity can be a specific collection of related data (a tablet), a specific user, or an organization. As different entities have different characteristics and needs, the data stored in association with the various entities requires different amounts of processor time to fulfill requests.

In some implementations, different entities have different processor usage needs. In a distributed server system, specific server systems are assigned to particular entities, and it is advantageous to ensure that the work load is balanced as evenly as possible across the various processors or processor cores. To achieve this balancing it is necessary to gather statistical information regarding the processor usage of processes or threads related to each entity of the plurality of entities. For the purposes of the discussion below, the terma, "processes" and "threads" will be generally used interchangeably to indicate specific sets of instructions executed on a processor for a specific purpose.

In some implementations, once statistical information about process usage is gather the server system can assign entities with high processor usage to server systems that have relatively low current usage, and thus spread the load around the distributed server system evenly. In some implementations this is accomplished by assigning a counter to all current entities. This counter can be stored with the data associated with a given entity or in an area of memory reserved for such counters. When a process associated with a specific entity is created, a pointer that references the counter is copied into the process. The process then begins executing on a processor core.

In some implementations, the operating system generates an interrupt signal after first predetermined amount of time. For example, the operating system generates an interrupt signal every 10 µs. In general, smaller predetermined amounts of time result in more accurate processor usage statistics.

In some implementations, upon determining that an interrupt signal has been generated, the kernel interrupts the processes executing on all the processor cores located at a particular server system. In some implementations the processors are all interrupted simultaneously. In other implementations, the cores are interrupted one at a time, in a staggered manner. Once the currently executing process has been interrupted, an interrupt hander is executed on the processor core to process the generated interrupt signal.

In some implementations, the interrupt handler determines whether the interrupted process has a pointer to a counter associated with an entity. In some implementations, certain processes, such as system maintenance processes, do not have pointer to a counter associated with a specific entity. When the interrupt handler determines that the interrupted process has a pointer to an associated counter, the interrupt handler dereferences the pointer to access the counter. The interrupt handler then increments the counter by one, corresponding to the process/thread executing on a processor for the associated time increment (e.g., 10 µs).

In some implementations, once the counter has been incremented the interrupted process is resumed. In general, the interrupt handler is designed to be small and efficient, and thus run quickly with minimal interruption to the overall system function.

In some implementations, after a second predetermined interval of time, the server system determines the total amount of processor core time for each entity with an associated with the server system. The second predetermined amount of time is longer than the first predetermined amount of time. For example, if the first predetermined amount of time is 10 µs, the second predetermined mount of time may be 1 minute. The server system identifies, for each entity with an associated process that has executed on a processor core of the server during the predetermined interval of time, an associated counter. The server system then reads the current counter values associated with each entity.

In some implementations, the counter values for each entity are multiplied by the first predetermined interval of time to estimate the total amount of time used by processes associated with each entity. For example, if the counter associated with Entity A is 11 and the first predetermined amount of time is 10 μs, the system would estimate that Entity A is responsible for 110 μs of processor use. In some implementations, the counter is then reset to zero once this calculation has been made.

In other implementations, the server determines a difference between the current counter value and a stored previous counter value. The server system retrieves both the current counter value and the stored counter value from the previous predetermined interval of time. The server system then subtracts the previous counter value from the current counter value to determine the change in the counter value during the most recent predetermined time interval. This difference is then multiplied by the first predetermined interval of time to estimate the total amount of time used by processes associated with each entity. For example, if the current counter value was 148 and the stored previous value was 114, the difference between the two would be 34. If the first predetermined amount of time is 10 μs the system would then estimate that the particular entity is responsible for 340 μs of processor core time. Once this calculation has been made the current counter value is stored in place of the previous counter value for use in the next calculation.

In some implementations the server system then compares the processor times for each entity to determine which entities use the most processor time. In some implementations this is done by comparing estimated total processor core usage times between the various entities.

In other implementations, the server calculates processor usage as a percentage of total processor availability. To accomplish this task the server must calculate the total number of interrupt signals sent by the operating system. In some implementations there is a general use counter on the server system that is incremented every time the counter interrupt signal is sent. This general use counter then holds the total number of time increments during the most recent second predetermined interval of time. Then, for each entity, the server system divides the entities total counter value by the general use counter value to determine a percentage of processor time used by the entity. For example, if Entity A had a counter value of 24 and the general use counter had a value of 320, the server system would determine that Entity A had used 7.5 percent of the total available processor time.

In some implementations the statistical information gather about each entity is then transmitted to the distributed server system for use in determining overall allocation of system resources. In some implementations, if a particular server has several entities whose associated processes use a large amount of server time, the distributed server system may move one or more of the heavy use entities (or their associated data) to another server in the distributed server system.

Figure 1:
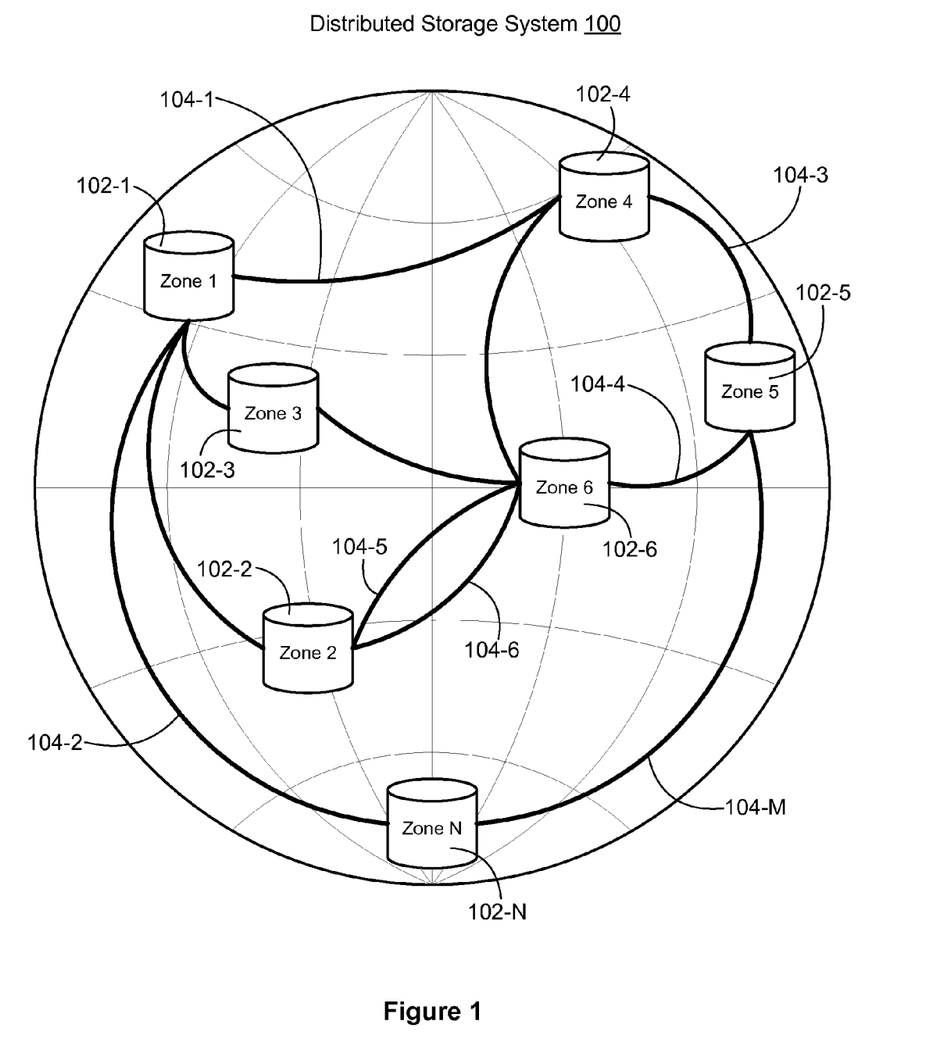
FIG. 1 is a block diagram illustrating a distributed storage system, according to some implementations.

FIG. 1 is a block diagram illustrating a distributed storage system 100, according to some implementations. The distributed storage system 100 includes a plurality of zones 102-1, 102-2, ... 102-N at various locations across the world, connected by network communication links 104-1, 104-2, ... 104-M. In some implementations, a zone (such as the zone 1 102-1) corresponds to one or more data centers that are geographically close to each other. For example, the North American region may correspond to one zone that includes two data centers, one located near the Pacific Coast and the other one located near the Atlantic Coast. Although the conceptual diagram of FIG. 1 shows a limited number of network communication links 104-1, etc., typical implementations would have many more network communication links.

In some implementations, there are two or more network communication links between the same pair of zones, as illustrated by links 104-5 and 104-6 between the zone 2 (102-2) and the zone 6 (102-6). In some implementations, the network communication links are composed of fiber optic cable. In some implementations, some of the network communication links use wireless technology, such as microwaves. In some implementations, each network communication link has a specified bandwidth and/or a specified cost for the use of that bandwidth. In some implementations, each zone maintains the statistic information about the transfer of data across one or more of the network communication links within the distributed storage system 100, including throughput rate, times of availability, reliability of the links, etc.

Figure 2:
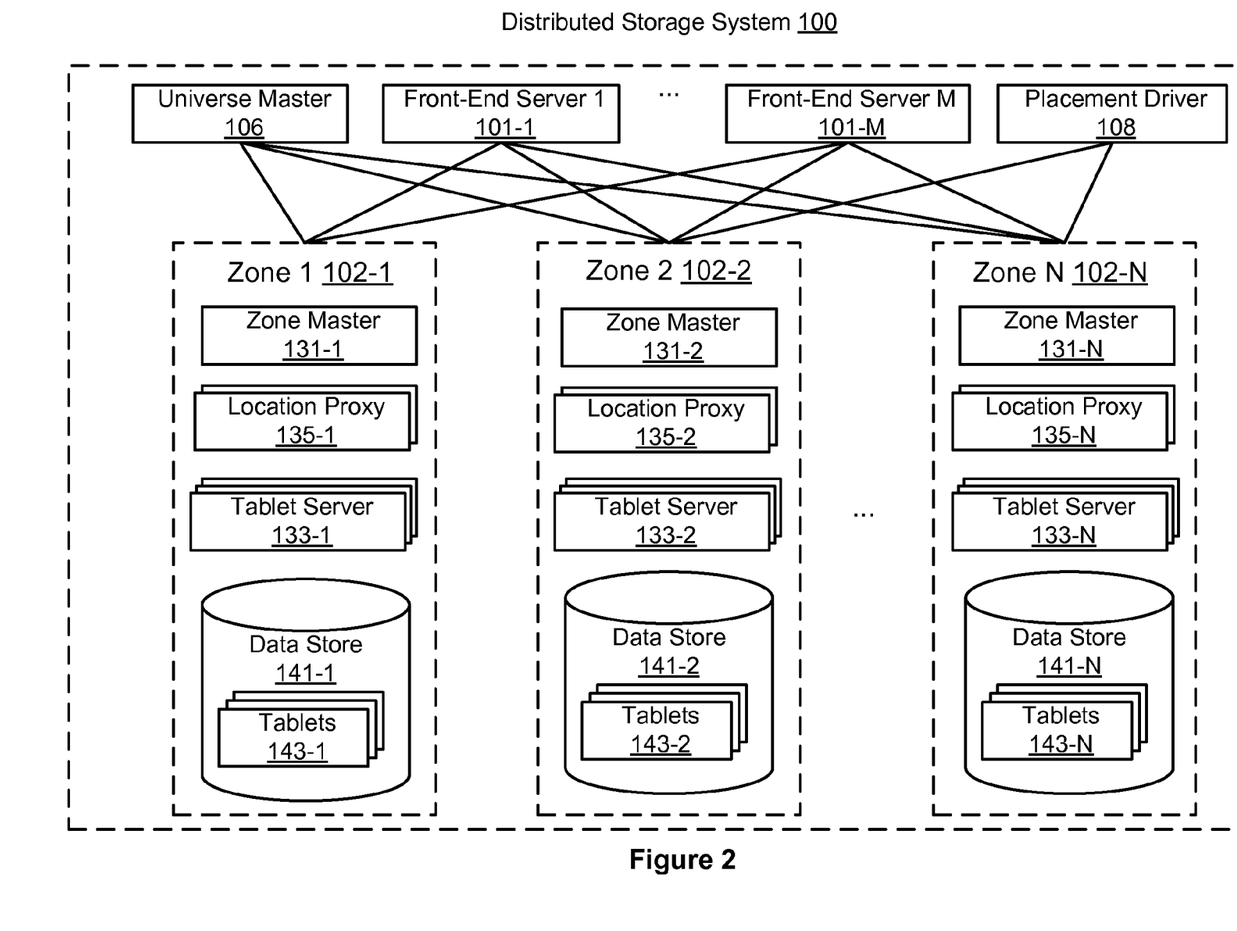
FIG. 2 is a block diagram illustrating components of the distributed storage system, according to some implementations.

FIG. 2 illustrates the components of the distributed storage system 100, according to some implementations. The distributed storage system 100 includes a universe master 106, one or more front-end servers (101-1, ..., 101-M), a placement driver 108, and a plurality of zones (102-1, 102-2, ..., 102-N). The universe master 106 and the placement driver 108 are responsible for monitoring the performance of the system 100 and controlling the data replication/migration between two zones. A zone (102-1, 102-2, ..., 102-N) typically includes a data store (141-1, 141-2, ..., 141-N) hosting a plurality of tablets (143-1, 143-2, ..., 143-N), and utilizes a cluster of computer servers, including a zone master (131-1, 131-2, ..., 131-N), one or more location proxies (135-1, 135-2, ..., 135-N), one or more tablet servers (133-1, 133-2, ..., 133-N) to perform all of the tablet-related tasks. The data store (141-1, 141-2, ..., 141-N) provides the underlying persistent storage space for data managed by a corresponding zone (102-1, 102-2, ..., 102-N).

In some implementations, data within the data store (141-1, 141-2, ..., 141-N) are organized into many tablets, which is a basic data unit handled within a particular zone. The zone master (131-1, 131-2, ..., 131-N) is responsible for assigning each tablet in the data store (141-1, 141-2, ..., 141-N) to one of the tablet servers (133-1, 133-2, ..., 133-N) for handling read/write requests directed at the tablet based, at least in part, on the CPU and memory usage at the tablet servers. For example, when the zone master determines that one tablet server is overloaded, it may orchestrate the migration of some tablets from this overloaded tablet server to other tablet servers in the same zone or maybe even another zone. A location proxy provides a location-lookup service to another entity (e.g., a front-end server or a tablet server) such that, for a given tablet, the location proxy identifies a respective tablet server that has been chosen for handling the read and write requests directed at the tablet.

Figure 3:
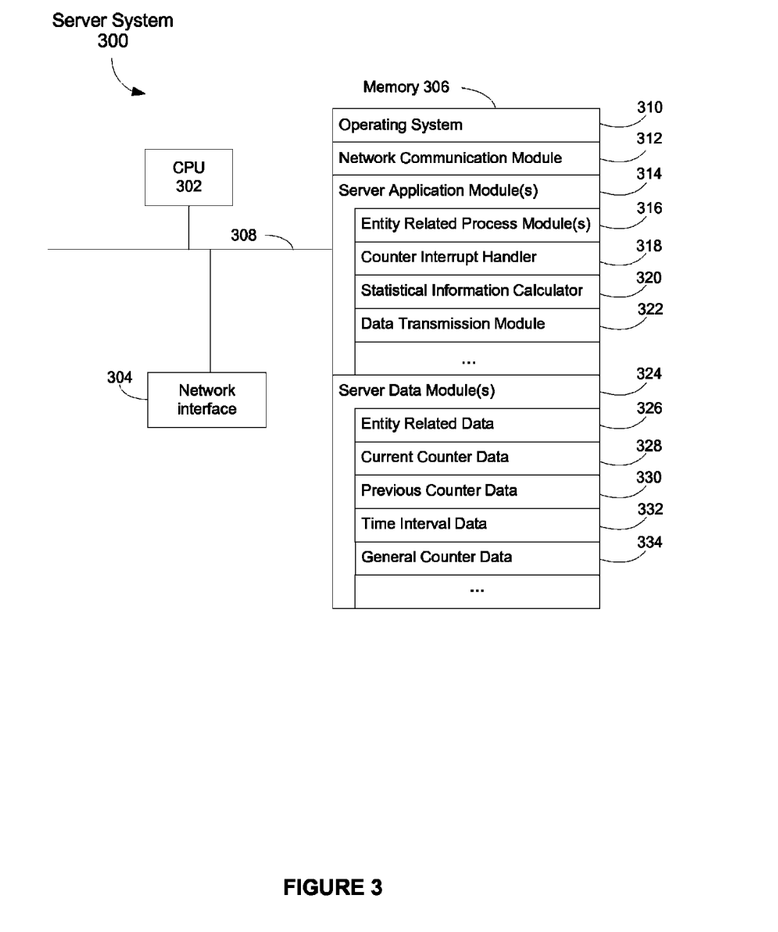
FIG. 3 is a block diagram illustrating the components of a server system, according to some implementations.

FIG. 3 is a block diagram illustrating a server system 300, in accordance with some implementations. The server system 300 typically includes one or more processing units (CPU's) 302, one or more network interfaces 304, memory 306, and one or more communication buses 308 for interconnecting these components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services, for performing hardware dependent tasks, generating interrupt signals, and a kernel for performing various tasks including scheduling and interrupting process;
- a network communication module 312 that is used for connecting the server system 120 to other computers via the one or more communication network interfaces 304 (wired or wireless) and one or more communication networks, such as the Internet, other wide area networks, local area networks, metropolitan area networks, and so on;
- one or more server application module(s) 314 for enabling the server system 300 to perform the functions offered by the server system 300, including but not limited to:
  - one or more entity related process module(s) 316 for executing processes associated with various entities on the CPU(s) 302, wherein each process includes in its local memory, a pointer to an associated counter;
  - a counter interrupt handler 318 for running on a processor 302 after an process is interrupted to determine whether the interrupted process has an associated pointer to a counter, if so, dereferencing the pointer to access the counter; incrementing the counter by one; and then allowing the interrupted process to resume;
  - a statistical information calculator module 320 for determining, based on either the difference in the counters between the current interval and the previous interval or just based on the current counter, the total amount of processor core time used by every entity associated with the particular server system 300 and calculating, based on total available time, the percentage of processor time used by each entity; and
  - a data transmission 322 for transmitting determined statistical data for one or more entities to the distributed server system for use in balancing processor load across the distributed server system; and
- one or more server data module(s) 324 for storing data related to the server system 300, including but not limited to:
  - entity related data 326 including any data stored on the server system related to a particular entity including files, documents, emails, account information or any other information;
  - current counter data 328 including current counts of processor usage for each entity associated with the server system 300;
  - previous counter data 330 including counter values for each entity associated with the server system 300 from the end of the most recent second predetermined time interval;
  - time interval data 332 including information defining the length of time of the first predetermined time interval and the second predetermined time interval;
  - general counter data 334 including a counter value representing the number of time intervals (first predetermined time intervals) since the end of the last second predetermined time interval.

Figure 4:
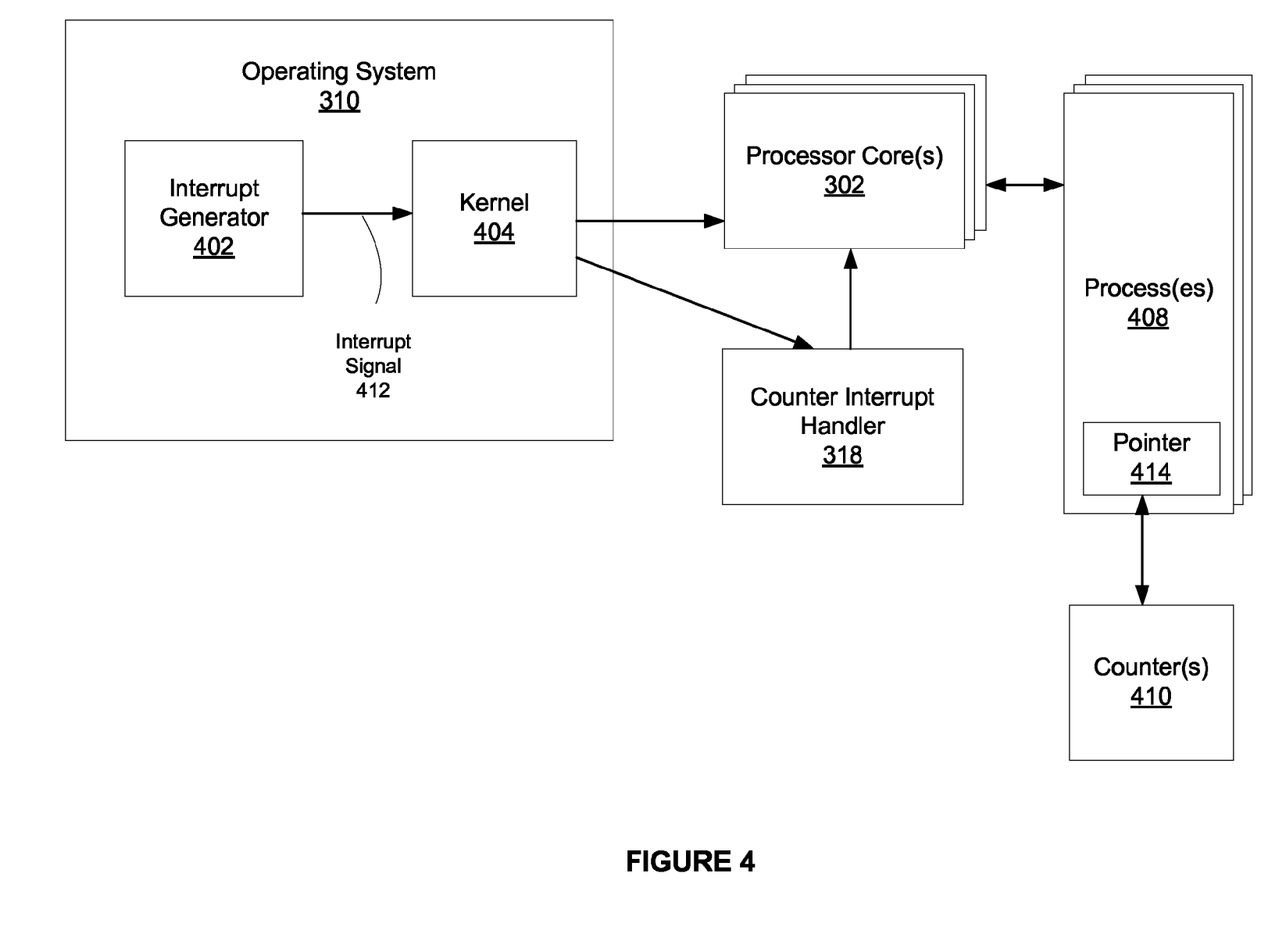
FIG. 4 is a block diagram illustrating the process of tracking processor usage and incrementing processor usage counters according to some implementations.

FIG. 4 is a block diagram illustrating the process of tracking processor usage and incrementing processor usage counters according to some implementations. In accordance with some implementations a plurality of entity related processes 408 are executed on one or more processor cores 302. Each process includes, in thread local storage, a pointer to a counter 410. Each counter is associated with a specific entity and each process includes a pointer to a counter that is related to the same entity as the entity related to the process itself.

In accordance with some implementations the operating system 310 (and the kernel 404 specifically) schedule processes to be executed on the one or more processor core(s) 302 based on priority data or other data associated with the plurality of processes 408. In some implementations, an interrupt generator 402 generates a counter increment interrupt signal 412 after a first predetermined time interval. The first predetermined time interval is a very short time interval in the range of 10 µs, in some implementations.

In some implementations the kernel 404 receives the generated counter increment interrupt signal 412. In response the kernel 404 interrupts the processes 408 currently being executed on the one or more processor cores 302. The kernel 404 executes the counter interrupt handler 318 on the process cores 302 with the interrupted processes 408.

In some implementation the counter interrupt handler 318 executes on one or more processors 302 in place of the interrupted processes 408. The counter interrupt handler 318 determines whether the interrupted process includes a pointer 414 to counter 410. In some implementations, the pointer is stored in the local storage (thread local storage) of the interrupted process 408. In accordance with a determination that the interrupted process does include a pointer to a counter 410, the counter interrupt handler dereferences the pointer to access the counter 410. The counter interrupt handler 318 then increments the counter 410 by one. The counter interrupt handler 318 then allows the interrupted process to resume.

Figure 5:
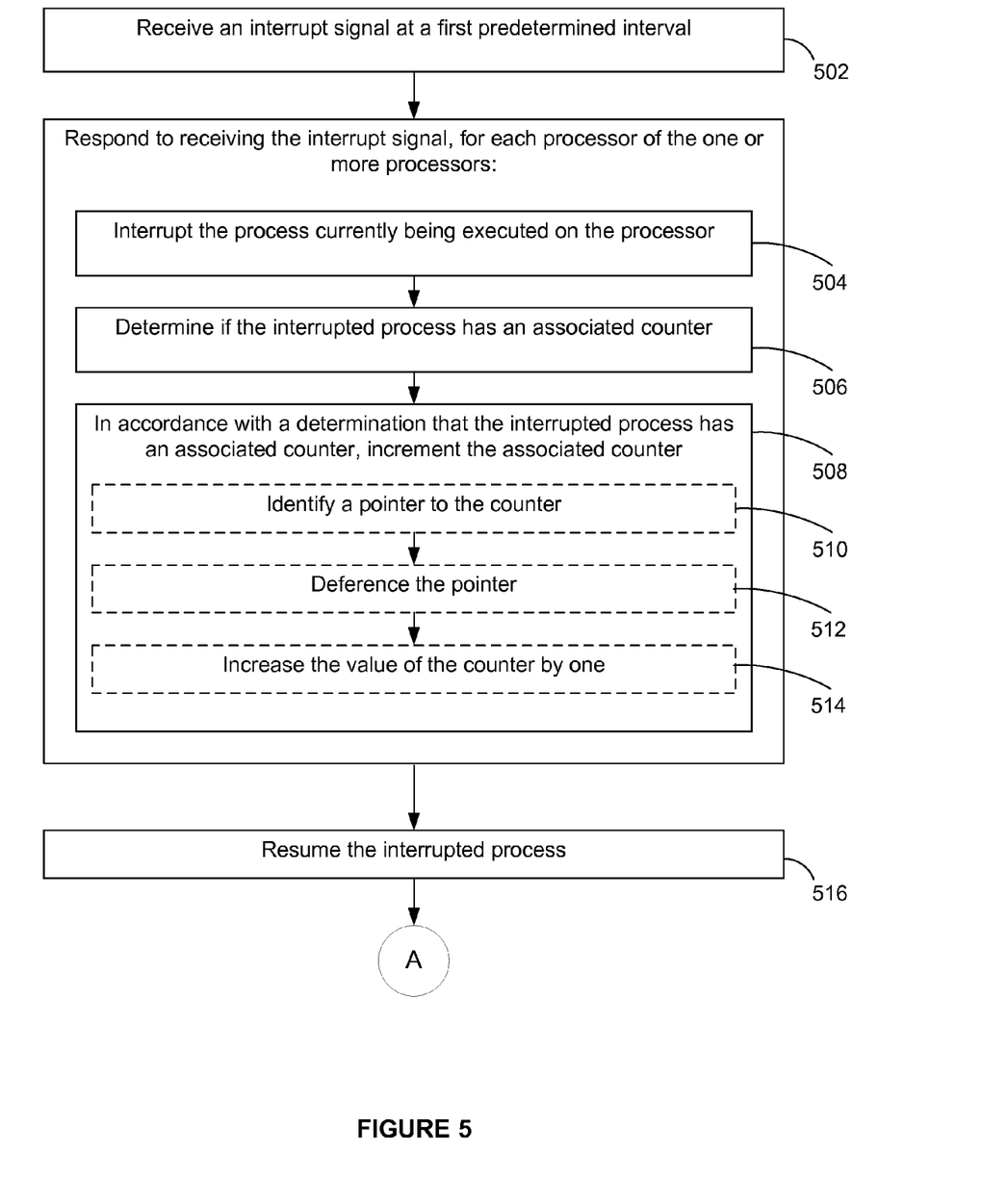
FIG. 5 is a flow diagram illustrating the process of gathering statistical data regarding process usage through the use of counters in accordance with some implementations.

FIG. 5 is a flow diagram illustrating the process of gathering statistical data regarding process usage through the use of counters in accordance with some implementations. Each of the operations shown in FIG. 5 may correspond to instructions stored in a computer memory or computer readable storage medium. Optional operations are indicated by dashed lines (e.g., boxes with dashed-line borders). In some implementations, the method described in FIG. 5 is performed by the server system (FIG. 3, 300).

In accordance with some implementations, the server system (FIG. 3, 300) receives an interrupt signal at a first predetermined interval (502). The predetermined time interval is a very small amount of time, such as 10 µs. In some implementations the signal is generated by the operating system being executed by the serve system (FIG. 3, 300) at regular intervals. The server system (FIG. 3, 300) responds to receiving the interrupt signal by, for each process of the one or more processors: interrupting the process currently being executed by the processor (504). The server system then determines whether the interrupted process has an associated counter (506).

In accordance with some implementations, the server system (FIG. 3, 300) then increments the associated counter (508) in accordance with a determination that the interrupted process has an associated counter. In some implementations the server system (FIG. 3, 300) increments the associated counter by identifying a pointer to the counter (510). This point is stored in the thread local storage of the interrupted process. The server system (FIG. 3, 300) then dereferences the pointer to access the counter (512). Once the counter has been access, the server system (FIG. 3, 300) increments the counter by one (514). The server system resumes the interrupted process (516).

Figure 6:
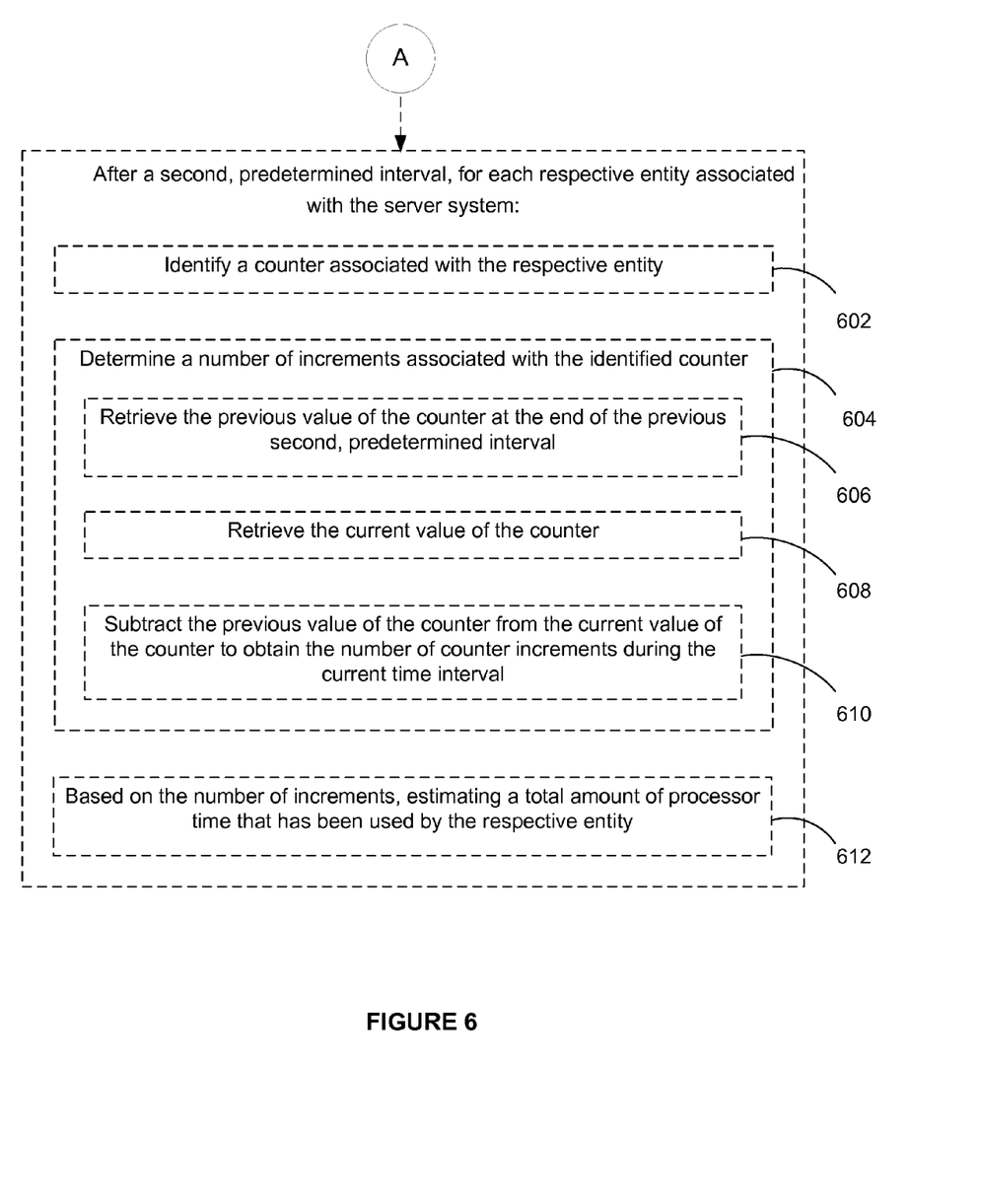
FIG. 6 is a flow diagram illustrating the process of gathering statistical data regarding process usage through the use of counters in accordance with some implementations.

FIG. 6 is a flow diagram illustrating the process of gathering statistical data regarding process usage through the use of counters in accordance with some implementations. Each of the operations shown in FIG. 6 may correspond to instructions stored in a computer memory or computer readable storage medium. Optional operations are indicated by dashed lines (e.g., boxes with dashed-line borders). In some implementations, the method described in FIG. 6 is performed by the server system (FIG. 3, 300).

In accordance with some implementations, after a second, predetermined interval, the server system (FIG. 3, 300) identifies, for each respective entity associated with the server system (FIG. 3, 300) identify a counter associated with the respective entity (602). The server system (FIG. 3, 300) then determines, for each respective entity, a number of increments associated with the identified counter (604). In accordance with some implementations the server system (FIG. 3, 300) determines the number of increments by retrieving a previous value of the counter at the need of the previous second predetermined interval (606). The server system (FIG. 3, 300) then retrieves the current value of the counter (608). The server system (FIG. 3, 300) then subtracts the previous value of the counter from the current value of the counter to obtain the number of counter increments during the current time interval (610). For example, if the previous value had been 647 and the current value was 756, the number of increments would be 109.

In accordance with some implementations, the server system (FIG. 3, 300) estimates the total amount of processor time that has been used by the respective entity based on the number of increments (612). For example, if the number of increments was 109 and the time per increment was 10 μs, the total processor time determined by the server system (FIG. 3, 300) would be 1090 μs.

Figure 7:
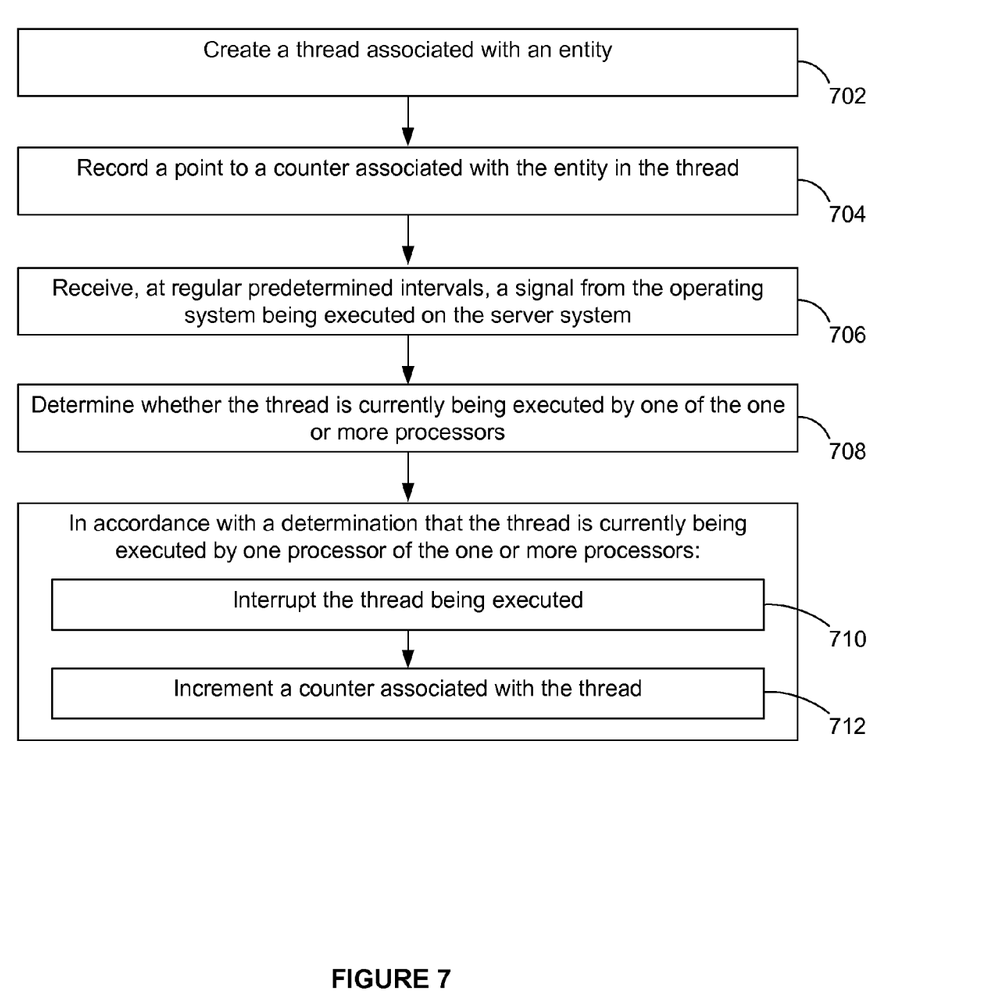
FIG. 7 is a flow diagram illustrating the process of thread creation and statistical information gathering for the newly created thread in accordance with some implementations.

FIG. 7 is a flow diagram illustrating the process of thread creation and statistical information gathering for the newly created thread in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the server system (FIG. 3, 300).

In some implementations, the server system (FIG. 3, 300) creates a thread associated with an entity (702). For example, if an organization had data stored at the server system, and initiated a data request, the system would then create a thread to process the request and send the data to the requestor. This thread would be associated to the entity (in this case an organization) to whom the data belonged. In some implementations, as part of created a thread, the server system (FIG. 3, 300) copies a pointer to a counter associated with the entity into the thread (704). In some implementations, the pointer is stored in thread local storage.

In some implementations, the server system (FIG. 3, 300) receives an interrupt signal form the operating system being executed on the server system (FIG. 3, 300) at regular intervals (706). The server system (FIG. 3, 300) then determines, for a particular thread, whether the thread is currently being executed by one of the one or more processors (708). In accordance with a determination that the thread is currently being executed, the server system (FIG. 3, 300) interrupts the thread being executed (710). The server system (FIG. 3, 300) then increments a counter associated with the thread (712). In some implementations the server system (FIG. 3, 300) increments the counter by identifying the pointer to the counter, dereferencing the pointer to access counter, and added one to the total stored in the counter.

The methods illustrated in FIGS. 5-7 may be governed by instructions that are stored in a computer readable storage medium and that are executed by at least one processor of at least one server. Each of the operations shown in FIGS. 5-7 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for measuring processor usage, comprising:
    on a server system having one or more processors and memory storing one or more programs for execution by the one or more processors:
        executing, on the one or more processors, one or more processes, wherein each of the one or more processes is associated with an entity from a group of one or more entities;
        receiving an interrupt signal at a first predetermined interval;
        in response to receiving the interrupt signal, for each processor of the one or more processors:
            interrupting a process currently being executed on the processor:
            determining if the interrupted process has an associated counter; and
            in accordance with a determination that the interrupted process has an associated counter, incrementing the associated counter;
        resuming the interrupted process; and
        estimating, for a respective entity, the total amount of processor time that has been used by the respective entity based on an analysis of one or more counters associated with the respective entity.

2. The method of claim 1, wherein incrementing an associated counter further comprises:
    identifying a pointer to the counter;
    dereferencing the pointer; and
    increasing the value of the counter by one.

3. The method of claim 1, further comprising:
    after a second predetermined interval:
        for each respective entity associated with the server system:
            identifying a counter associated with the respective entity; and
            determining a number of increments associated with the identified counter;
            wherein the estimating, for the respective entity, is based on the determined number of increments.

4. The method of claim 3, wherein the second time interval is of longer duration than the first time interval.

5. The method of claim 3, wherein determining the number of increments associated with the identified counter further comprises:
    retrieving the first value of the identified counter at the end of the previous interval;
    determining the current value of the identified counter; and
    subtracting the first value of the identified counter from the current value of the identified counter to obtain the number of counter increments during the current time interval.

6. The method of claim 1, wherein an entity is a tablet, a person, or an organization.

7. A method for tracking processor usage of a thread, the method comprising:
    on a server system having one or more processors and memory storing one or more programs for execution by the one or more processors:
        creating a thread associated with an entity;
        recording a pointer to a counter associated with the entity in the thread;
        receiving, at regular, predetermined intervals, a signal from the operating system being executed on the server system;
        determining whether the thread is currently being executed by one of the one or more processors;
        in accordance with a determination that the thread is currently being executed by one processor of the one or more processors:
            interrupting the thread being executed; and
            incrementing a counter associated with the thread; and
        estimating the total amount of processor time that has been used by the entity based on an analysis of one or more counters associated with the entity including the counter associated with the thread.

8. The method of claim 7, wherein incrementing the associated counter further comprises:
    identifying the pointer to the associated counter;
    dereferencing the pointer; and
    increasing the value of the associated counter by one.

9. The method of claim 7, further comprising:
    after a second predetermined time interval:
        for each respective entity for which an associated thread has executed at least once during the second time interval:
            determining a counter associated with the entity; and
            determining a number of increments associated with that counter;
            wherein the estimating is based on the determined number of increments.

10. The method of claim 9, further comprising:
    normalizing the total number of increments for a counter over the total number of increments employed by all threads during the most recent predetermined time interval.

11. The method of claim 9, wherein the second time interval is of longer duration than the first time interval.

12. The method of claim 9, wherein determining the number of counter increments associated with that counter further comprises:
    retrieving the first value of the counter at the end of the previous interval;
    determining the current value of the counter; and
    subtracting the first value of the counter from the current value of the counter to obtaining the number of counter increments during the current time interval.

13. The method of claim 7, wherein an entity is a tablet, a person or an organization.

14. A server system, comprising:
    one or more processors;
    memory storing one or more programs to be executed by the one or more processors;
    the one or more programs comprising instructions for:

executing, on the one or more processors, one or more processes, wherein each of the one or more processes is associated with an entity from a group of one or more entities;

receiving an interrupt signal at a first predetermined interval;

in response to receiving the interrupt signal, for each processor of the one or more processors:
   interrupting a process currently being executed on the processor:
   determining if the interrupted process has an associated counter; and
   in accordance with a determination that the interrupted process has an associated counter, incrementing the associated counter;

resuming the interrupted process; and estimating, for a respective entity, the total amount of processor time that has been used by the respective entity based on an analysis of one or more counters associated with the respective entity.

15. The system of claim 14, wherein the instructions for incrementing an associated counter further include instructions for:
   identifying a pointer to the counter;
   dereferencing the pointer; and
   increasing the value of the counter by one.

16. The system of claim 14, the one or more programs further including instructions for:
   after a second predetermined interval:
      for each respective entity associated with the server system:
         identifying a counter associated with the respective entity; and
         determining a number of increments associated with the identified counter;
         wherein the estimating, for the respective entity, is based on the determined number of increments.

17. The system of claim 16, wherein the second time interval is of longer duration than the first time interval.

18. The system of claim 16, wherein the instructions for determining the number of increments associated with the identified counter further include instructions for:
   retrieving the first value of the identified counter at the end of the previous interval;
   determining the current value of the identified counter; and
   subtracting the first value of the identified counter from the current value of the identified counter to obtain the number of counter increments during the current time interval.

19. The system of claim 14, wherein an entity is a tablet, a person, or an organization.

* * * * *